US011461874B2

(12) United States Patent
Beri et al.

(10) Patent No.: US 11,461,874 B2
(45) Date of Patent: Oct. 4, 2022

(54) GRAPHICS PROCESSING USING MATRICES OF TRANSFORMATIONS

(71) Applicant: ADOBE INC., San Jose, CA (US)

(72) Inventors: Tarun Beri, Uttar Pradesh (IN); Vivek Agrawal, Uttar Pradesh (IN); Gaurav Jain, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/838,864

(22) Filed: Apr. 2, 2020

(65) Prior Publication Data

US 2021/0312590 A1 Oct. 7, 2021

(51) Int. Cl.
*G06T 3/40* (2006.01)
*G06T 3/00* (2006.01)
*G06T 1/20* (2006.01)

(52) U.S. Cl.
CPC .............. *G06T 3/4038* (2013.01); *G06T 1/20* (2013.01); *G06T 3/0006* (2013.01); *G06T 3/4084* (2013.01)

(58) Field of Classification Search
CPC ... G06T 3/0006; G06T 3/4038; G06T 3/4084; G06T 1/20; G06T 3/0068
See application file for complete search history.

(56) References Cited

U.S. PATENT DOCUMENTS

| 4,817,172 A * | 3/1989 | Cho ........................... G06T 1/20 345/666 |
| 8,253,747 B2 * | 8/2012 | Niles ....................... G06T 13/00 345/474 |
| 8,280,703 B1 * | 10/2012 | Mech ..................... G06T 11/001 703/2 |
| 8,300,951 B1 * | 10/2012 | Mech ....................... G06K 9/48 382/203 |
| 9,984,481 B2 * | 5/2018 | Asente ................ G06F 3/04883 |
| 9,990,740 B2 * | 6/2018 | Natzke .................. G06T 11/001 |

(Continued)

OTHER PUBLICATIONS

Jacobs, Jennifer et al., "Extending Manual Drawing Practices with Artist-Centric Programming Tools", CHI 2018, Apr. 21-26, 2018, pp. 1-13 (Year: 2018).*

(Continued)

*Primary Examiner* — Chante E Harrison
(74) *Attorney, Agent, or Firm* — Shook, Hardy & Bacon L.L.P.

(57) ABSTRACT

A graphics processing system generates and employs an affine transformation matrix of transformations for creation of computer graphics replications. The affine transformation matrix encapsulates transformations to the base art to create a replication of a computer graphic. For given transformations, the graphics processing system identifies operations and operation configuration data relating to each operation. For each operation, the graphics processing system generates coefficients for the affine transformation matrix. The affine transformation matrix is multiplied with the base art to generate the repetition. In some configurations, each repetition may require more than one affine transformation matrix to achieve the desired repetition. The order of application of affine transformation matrices to the base art is also modified depending on order of operations to be applied to the base art. A prior repetition may serve as base art for another level of repetition.

20 Claims, 12 Drawing Sheets

(56) References Cited

U.S. PATENT DOCUMENTS

| | | | |
|---|---|---|---|
| 10,380,769 B1 | 8/2019 | Beri et al. | |
| 10,685,472 B1* | 6/2020 | Rasheed | G06T 13/80 |
| 2009/0141043 A1* | 6/2009 | Guo | G06T 3/4038 |
| | | | 345/629 |
| 2011/0187720 A1* | 8/2011 | Pedersen | G06T 11/20 |
| | | | 345/442 |
| 2012/0182318 A1* | 7/2012 | Mansfield | G06T 3/0006 |
| | | | 345/643 |
| 2017/0309045 A1* | 10/2017 | Asente | G06T 3/0006 |
| 2018/0040149 A1* | 2/2018 | Bartels | G06T 3/60 |
| 2018/0322612 A1* | 11/2018 | Asente | G06T 11/40 |
| 2020/0020139 A1* | 1/2020 | Kumar | G06T 11/001 |
| 2020/0117347 A1* | 4/2020 | Vol | G06T 11/40 |
| 2020/0302658 A1* | 9/2020 | Simon | G06T 3/4038 |
| 2021/0019925 A1* | 1/2021 | Garcia Salvadores | |
| | | | G06T 11/60 |

OTHER PUBLICATIONS

Lovett, Amy, "Create repeat pattens with a Live Pattern Preview in Affinity Designer for iPad", pp. 1-19, https://affinityspotlight.com/article/create-repeat-patterns-with-a-live-pattern-preview-in-affinity-designer-for-ipad/ (Year: 2019).*

* cited by examiner (Sx,Sy)

GRAPHICS PROCESSING USING MATRICES OF TRANSFORMATIONS

BACKGROUND

As the complexity of computer graphics continues to grow exponentially, the ability to produce, manipulate, and replicate such graphics on a large scale quickly and efficiently has become paramount. Traditionally, graphics processing systems provide the user with the ability to manipulate multiple instances of computer graphic to create a complex final output. In order to process each instance of the computer graphic, the graphics processing software may store copies of the original computer graphic for each instance. To create the final graphic, each copy of the original computer graphic must be accessed and modified. This approach of storing and operating on separate copies of the original graphic has been successful when the number of replications and modifications is small. However, use of a high number of replications and modifications or nested replications (a prior replication is used to create another repetition) poses challenges to the use of separate copies of the original graphic as storage needs of such complex and high volume replications exponentially grow, making it difficult to create complex computer graphics quickly and making it likely that the system will fail to store (let alone operate on) a high volume of memory-intensive computer graphics data.

SUMMARY

Embodiments of the present invention relate to, among other things, a graphics processing system that employs affine transformation matrices of transformations for computer graphics replication and modification. The graphics processing system takes a transformation and parses out operations that can be easily translated into an affine transformation matrix. The affine transformation matrix represents operations (from the transformation) to perform on the base art to create a repetition. When constructing the affine transformation matrix, the graphics processing system generates values for coefficients in the affine transformation matrix. The graphics processing system multiplies the affine transformation matrix with the base art to create a repetition of the base art in the final graphic. In some configurations, a transformation requires more than one affine transformation matrix. The graphics processing system can employ several affine transformation matrices for a transformation by multiplying them one-by-one with the base art to create repetitions, accounting for the order of operations to create the transformation. Moreover, in some configurations, the repetitions are nested, with a prior repetition being used as base art to create a second repetition.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
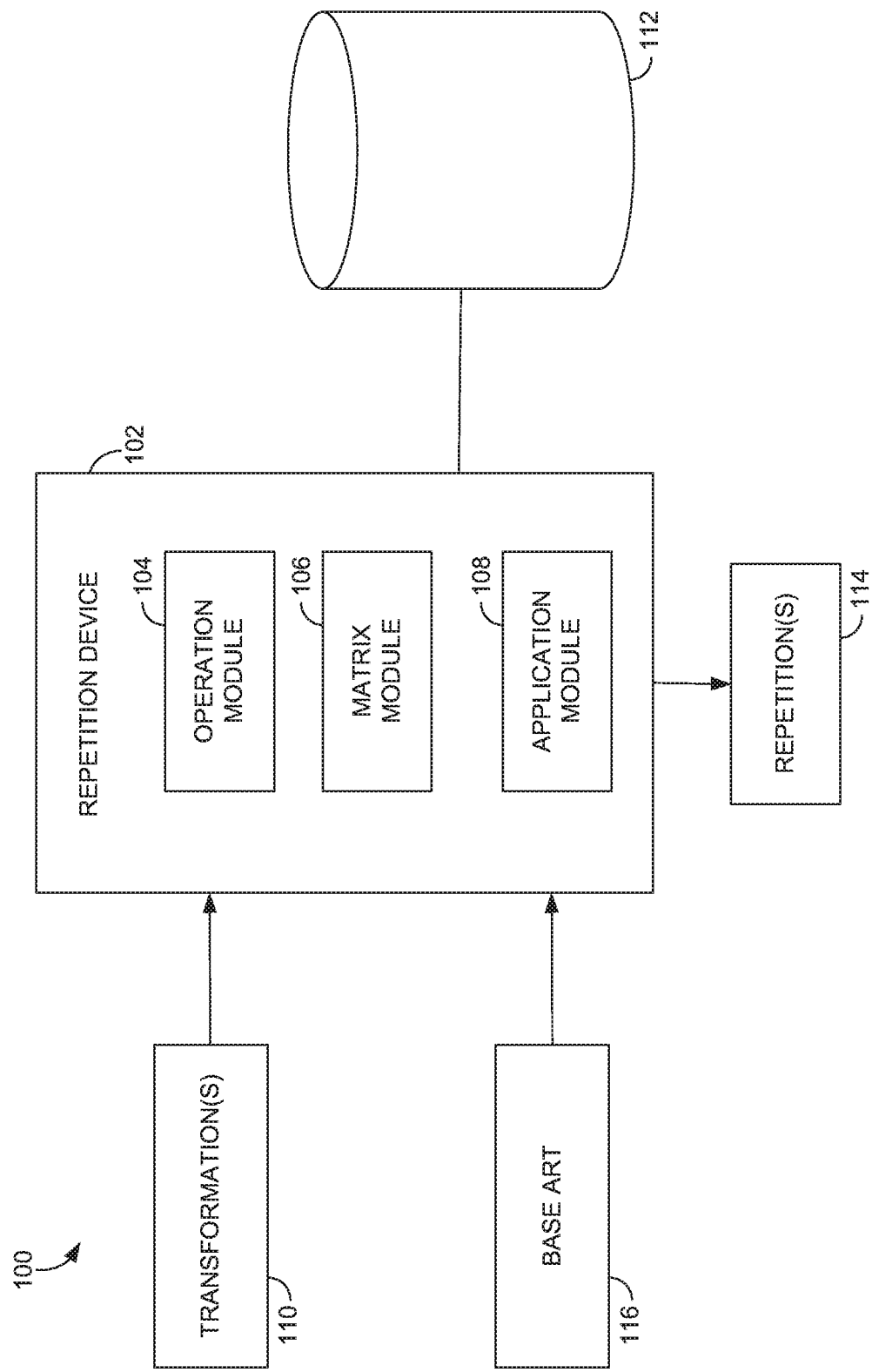
FIG. 1 is a block diagram illustrating an exemplary system in accordance with some implementations of the present disclosure.

Computer graphics replication and manipulation is often accomplished by conventional graphics processing systems creating copies of the original computer graphic and modifying each one. Each copy is stored as a raster image or vector graphics, both of which occupy significant memory space. The goal of such graphics processing systems is to facilitate complex graphics replications and manipulations that are scalable, nested, and performed in a short period of time (e.g., a few milliseconds). Although each instance of a computer graphic can be stored separately, when a graphic is replicated, nested, or scaled a large number of times, the creation of a complex computer graphic can be both resource and time intensive for the graphics processing system.

Embodiments of the present invention are directed to a graphics processing system that addresses these challenges by providing a solution that efficiently expresses instances of a computer graphic (and any transformations to them) in a memory-compact data structure such as a matrix. At a high level, the graphics processing system builds affine transformation matrices to be applied to base art. While conventional search systems typically generate individual copies of the base art for each replication, the graphics processing system described herein forms matrices of desired graphics replications that are all applied to a single instance of the base art.

In accordance with the technology described herein, a transformation to a base art is processed to generate one or more affine transformation matrices for repetitions from parsed operations. For instance, an affine transformation matrix can be generated for each transformation resulting in a repetition. For each transformation, the affine transformation matrix encapsulates the operations performed on a base art to create the repetition. Each affine transformation matrix is applied to the base art to create a repetition.

The graphics processing system employs the affine transformation matrix to generate repetitions in a variety of patterns. For a given transformation, the graphics processing system identifies operations and operation configuration data, which are values relevant to each operation. Based on the type of operation, the graphics processing system generates coefficients that reside in particular positions within the affine transformation matrix. The affine transformation matrix is multiplied with the coordinates of base art to generate a repetition.

In some configurations, each repetition may require more than one affine transformation matrix to achieve the desired repetition. The order of application of multiple affine transformation matrices to the base art is also modified depending on the repetition pattern selected. In some configurations, the multiple affine transformation matrices are multiplied to create one affine transformation matrix. However, the order of multiplying the matrices affects the order in which the corresponding operations are applied to a base art. The graphics processing system employs the affine transformation matrices one-by-one to create multiple repetitions by multiplying the affine transformation matrix with the coordinates of the base art.

The graphics processing system described herein provides a number of advantages over conventional systems. Initially, the use of affine transformation matrices of transformations increases efficiency in several ways. For instance, affine transformation matrices allow the graphics processing system to express creating multiple instances of a computer graphic without storing a copy of the base art for each and every repetition. Moreover, the affine transformation matrices express multiple operations to perform on a given instance of a base art. Additionally, the graphics processing system generates affine transformation matrices that can be applied to previous repetitions, thereby allowing a high level of nested repetitions to be represented by a series of affine transformation matrices instead of exponentially increasing storage of base art copies in memory. When transformations are represented as affine transformation matrices, each matrix can be stored using very few bits, which is highly memory efficient, and allows for easy implementation during final graphic rendering to further improve efficiency. Additionally, the graphics processing system can consolidate the multiplication of multiple affine transformation matrices with the coordinates of the base art, which helps modern processors and compilers to optimize for performance. Likewise, the use of affine transformation matrices provides a number of other benefits: reducing the file size of a computer graphic storing repetitions of the base art, cutting down on the time needed to generate a repetition, and decreasing the time spent parsing operations to perform on the base art to create a repetition.

Repetition System Using Operations and Matrices from Transformations

With reference now to the drawings, FIG. 1 is a block diagram illustrating an exemplary system 100 for creating repetitions using operations and matrices derived from transformations in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes repetition device 102 that includes an operation module 104, a matrix module 106, and an application module 108. The repetition device 102 shown in FIG. 1 can comprise a computer device, such as the computing device 1600 of FIG. 16, discussed below. In various embodiments, the replication device 102 may be provided, for instance, by a user device, a server device, or any combination thereof. While the repetition device 102 is shown as a single device in FIG. 1, it should be understood that the repetition device 102 may comprise multiple devices cooperating in a distributed environment. For instance, the repetition device 102 could be provided by multiple server devices collectively providing the functionality of the repetition device 102 as described herein. Additionally, other components not shown may also be included within the network environment. When multiple devices are employed, the devices can communicate via a network (not shown), which may include, without limitation, one or more local area networks (LANs) and/or wide area networks (WANs). Such networking environments are commonplace in offices, enterprise-wide computer networks, intranets, and the Internet. It should be understood that any number of devices and networks may be employed within the system 100 within the scope of the present invention.

At a high level, the repetition device 102 generally operates to receive a transformation 110 and a base art 116 and generate a repetition 114 by applying the transformation 110 to the base art 116. Base art 116, for example, is the original computer graphic that is transformed to display as a repetition on the screen. In some configurations, base art 116 may be stored as a raster image or vector graphics. A raster image, for instance, includes images stored as colored pixels capable of being displayed. Vector graphics, for instance, includes artwork expressed as vectors and mathematical calculations that the GPU uses to render an image.

A repetition 114 of base art, for example, appears as a modified replication of the base art 116 on a display screen. In some configurations, repetitions 114 are generated by applying an affine transformation matrix to the base art 116. In further embodiments, nested repetitions, where a prior repetition is used as base art to generate successive levels of repetition, are also possible. For instance, if a symmetry pattern repetition is applied to the base art to create a first level of repetition, then a radial pattern repetition of the symmetry pattern repetition would be a second level of repetition.

The repetition device 102 operates to construct one or more affine transformation matrices from the transformation 110 and employ the affine transformation matrices when creating the repetition 114. As part of this process, the repetition device 102 generates operations from the transformation 110 and employs those operations in building the affine transformation matrix(ices). As shown in FIG. 1, the repetition device 102 includes an operation module 104, matrix module 106, and application module 108. In some configurations, the transformation 110 refers to one or more operations that modify base art to create a repetition of base art. In further embodiments, transformations of the base art produce repetitions in various patterns including grid, radial, concentric, symmetry and path patterns.

The operation module 104 operates to generate an operation or set of operations for a transformation 110. An operation comprises one or more modifications to the base art 116 to apply the transformation 110 to the base art 116 in order to generate the repetition 114. An operation, for example, may refer to a modification to the base art 116. In some configurations, operations may include shearing, scaling, translating, reflecting, and rotating the base art. For example, if the transformation was to create a radial pattern repetition of base art, the operations would be to translate and rotate the replication of the base art into the desired position and at the desired angle in a circular pattern. Operations may be associated with "operation configuration data," which specify values necessary to implement the operations to achieve the desired transformation to the base art. For instance, operation configuration data for a translation operation would include the changes in the x- and y-directions to generate a repetition of the base art in the desired location in the final graphic.

In other words, the transformation 110 is broken down into an operation or a set of operations such as shearing, scaling, translating, reflecting, and rotating the base art 116. The process of parsing the transformation 110 into one or more operations translates the necessary modifications to create the repetition 114 into coefficients that can be expressed using an affine transformation matrix, which is a highly efficient mechanism to capture multiple operations to perform on a replication of the base art 116.

In some configurations, the operation module 104 parses the transformation 110 into one or more operations and identifies corresponding operation configuration data. The format of operation configuration data varies by operation type. For example, operations involving rotation require the degrees of rotation (which may be expressed in various forms) and the center that the base art 116 is rotated around. Moreover, the operation configuration data for operations involving scaling of the base art 116 represents the resizing of the replication relative to the base art 116 and may be expressed as percentages or the decimal form of percentages. Operation configuration data for translation of the base art 116 is often expressed as distances in a coordinate system. For each transformation, the operation module 104 associates the operation with each respective operation configuration data.

The operation module 104 generates an operation for the transformation 110 by determining changes to the base art 116 to apply the transformation 110. Each transformation 110 is associated with an operation or set of operations, as described in detail below with reference to FIGS. 2-7. To determine the necessary changes to base art 116 to generate the transformation 110, a lookup table storing the set of associated operations for a transformation 110 is retrieved from the data store 112. Based on the transformation 110, the corresponding entry in the lookup table is accessed and an associated operation or set of operations is parsed from transformation 110. For instance, to parse corresponding operations for a grid pattern repetition, the lookup table is retrieved, the corresponding entry accessed, and the necessary translation and scaling operations are parsed from the grid pattern repetition transformation.

In some configurations, a user interface is provided that prompts a user to provide input that identifies the type of repetition to create (e.g., grid, radial, concentric, symmetry, or path pattern) and the operation configuration data for the related operations. For example, for a grid pattern repetition, a user may input the number of rows and columns in the grid along with the spacing between the grid cells. In some configurations, the change in coordinates of the transformed base art determines the operations and operation configuration data. For example, the operation module 104 calculates the change in coordinates from a user resizing and rotating the base art 116 and expresses the amount of resizing of the repetition 114 as a percentage. The operations are input data for the matrix module 106, such that the operations are used to generate an affine transformation matrix(ices).

The matrix module 106 operates to construct an affine transformation matrix(ices) from the operations derived from the transformation 110. Some approaches for the matrix module 106 to generate one or more affine transformation matrices are described in detail below with reference to FIGS. 2-7. The affine transformation matrix built by the matrix module 106 encapsulates multiple operations to perform on a base art 116, including the operation configuration data. In some configurations, an "affine transformation matrix" refers to a matrix that describes the transformations to apply to base art to create a repetition. For example, an affine transformation matrix can be a 3×3 matrix with 6 coefficients "a," "b," "c," "d," "e," and "f," that determine the scaling, translation, reflection, shear, and rotation to apply to the base art to produce a repetition. In this example, the "a" and "d" coefficients represent scaling along the x- and y-directions, respectively. Likewise, the "a," "b," "c," and "d" coefficients represent rotation. The "e" and "f" coefficients represent translation along the x- and y-directions, respectively. Using such coefficients, the affine transformation matrix may be represented with the following notation:

$$M = \begin{Bmatrix} a & b & e \\ c & d & f \\ 0 & 0 & 1 \end{Bmatrix}$$

As such, the affine transformation matrix provides a mechanism for efficient capture of operations on the base art 116 to apply the transformation 110 and create the repetition 114 by: avoiding storing multiple copies of memory-intensive base art, avoiding storage of multiple operations as separate data structures, and reducing the computation load on graphics processing units.

In some configurations, the matrix module 106 builds the affine transformation matrix(ices) by identifying operation types and the operation configuration data for a particular transformation 110. The matrix module 106 determines which coefficient in the affine transformation matrix represents each operation and incorporates the operation configuration data into the coefficient. This process is performed for each operation contained in the transformation 110. In some configurations, a separate affine transformation matrix is generated for each operation or set of operations. Additionally, the matrix module 106 determines the order in which operations and the operation configuration data are incorporated into coefficients based on the transformation 110. Likewise, multiple affine transformation matrices may be multiplied, following the order that operations are applied, to create one affine transformation matrix representing multiple operations.

The affine transformation matrix(ices) is(are) stored in the data store 112, for use in applying the transformation 110 to the base art 116. In some configurations, the affine transformation matrix(ices) is(are) stored in the CPU memory or GPU memory, shown as 1608 and 1612 in FIG. 16, respectively. However, it should be understood by one skilled in the art that other types of data structures may be employed.

The application module 108 operates to employ the affine transformation matrix built by the matrix module 106 to apply the transformation 110 to the base art 116 in order to provide a repetition 114. In operation, the application module 108 accesses the base art 116 and retrieves the affine transformation matrix stored in the data store 112 to apply the transformation 110 to the base art 116. In some configurations, the base art 116 may also be stored in data store 112 for retrieval by the application module 108.

The application module 108 applies the affine transformation matrix to the base art 116 by multiplying coordinates of the base art 116 with coefficients of the affine transformation matrix. For each set of the coordinates of the base art's points identified by the application module 108, the application module 108 multiplies the affine transformation matrix(ices) with the coordinates to generate a new set of coordinates of the repetition 114. The order in which multiple affine transformation matrices are multiplied with the coordinates is determined by the order of operations applied to the base art 116. In some configurations, the coordinates of the corners in the base art 116 represented as a raster image are multiplied by the matrices.

In some configurations, prior to multiplying the coordinates with the matrices, the application module 108 sends the base art 116, represented as a vector graphics, to the GPU to deconstruct the base art 116 into triangles and process them one-by-one. The application module 108 then retrieves the points in the base art 116, which are the beginning and endpoints to vectors in the base art 116. For instance, if the base art 116 is stored as vector graphics that are to be scaled by 150% in a concentric pattern repetition, the application module 108 would determine the new coordinates of each point in each replication 114 by multiplying the coordinates for each point from the base art 116 with the respective affine transformation matrix.

With vector graphics, however, the GPU only processes the base art 116 one time and relies on affine transformation matrices to generate all repetitions. For example, a first affine transformation matrix would be multiplied with the base art 116 (that was previously processed by the GPU) to generate the coordinates for a first repetition of the base art 116 scaled by 150%. Then, a second affine transformation matrix would be multiplied with the coordinates of the base art 116 to generate the location coordinates of a second repetition 150% larger than the first repetition. As described below, once the coordinates have been determined, the GPU may then draw the graphic, or output, without the need to deconstruct the first and second repetitions into triangles for final graphic rendering. By processing the base art 116 in the GPU once and then applying the affine transformation matrix(ices) to the base art 116 to create repetitions, the memory and resources used to generate the final graphic are vastly reduced. Instead of the GPU processing multiple copies of the base art 116, resources are consolidated to process the base art 116 once.

The multiplication with the coordinates of the base art 116 occurs separately for each affine transformation matrix. In some configurations, there will be at least N multiplications occurring, where N is the number of repetitions. Some processors, however, may be able to optimize multiplication of multiple matrices into fewer operations. In some configurations, the application module 108 retrieves the affine transformation matrix(ices) from the CPU memory and uploads it to the GPU memory for multiplication described above and for rendering of the final graphic described below.

Using the coordinates of the repetition 114, the final graphic is rendered. In some configurations, with the GPU having processed the base art 116, which was formatted as a vector graphics, as mentioned above, the GPU merely draws or renders the vectors represented by the new set of coordinates to produce the final graphic. Likewise, in some configurations, where the base art 116 is a raster image, the GPU multiplies the coordinates of the corners of the base art 116 with the matrices to determine the bounds of the image and resamples the pixels within accordingly. A repetition 114 is generated that represents the transformation 110 performed on the base art 116 based on the application of the affine transformation matrix on the base art 116.

In some configurations, the generated repetition 114 may be then output as a raster image that can be used to create another repetition. New affine transformation matrices can be generated and applied to the repetition 114. By using repetition 114 as the base art 116 to create another layer of repetitions, the system can create a nested repetition using affine transformation matrix(ices).

Generating a Repetition of Base Art

Figure 2:
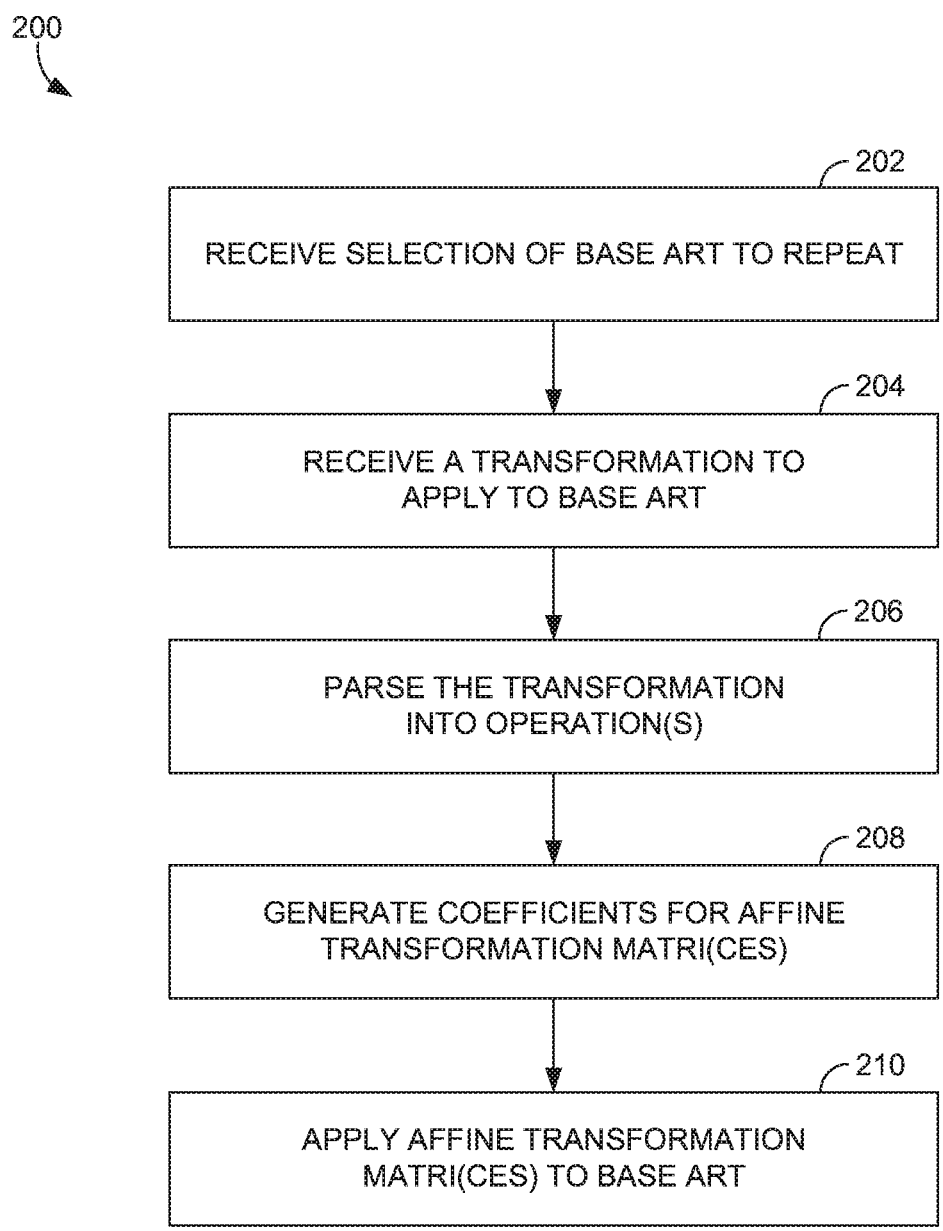
FIG. 2 is a flow diagram showing a method for generating a repetition in accordance with some implementations of the present disclosure.

With reference now to FIG. 2, a flow diagram is provided that illustrates a method 200 for generating a repetition. The method 200 may be performed, for instance, by repetition device 102 of FIG. 1. The method 200 may be performed for each transformation of a base art. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 202, a selection of a base art is received. This allows the base art to be identified for the creation of repetitions. In some configurations, the base art is a vector graphics or raster image. However, it should be understood that other formats of base art may be selected within the scope of the technology described herein.

The base art can be received in a variety of ways. By way of example only and not limitation, in some instances, a graphical user interface is provided that allows a user to upload a computer graphic as base art. Likewise, the graphical user interface may also present a number of pre-stored computer graphics for the user to select from.

Figure 8:
FIG. 8 is a computer graphic providing an example of a base art used to generate the repetitions shown in FIGS. 9-13.

FIG. 8 provides an example of a base art. This exemplary base art is used to create several types of repetitions as described in detail below with reference to FIGS. 9-13.

Turning back to FIG. 2, a transformation to apply to the base art is received, as shown at block 204. The transformation may be received, for instance, by prompting the user to select the types of transformations to perform on the base art. For example, the user may be presented and asked to select a type of transformation, including transformations to create grid, radial, concentric, symmetry, and path pattern repetitions. In some configurations, the user is able to interact with a graphical user interface and dynamically manipulate the base art to achieve desired transformations. For example, the user can resize the base art to a size on the screen that should then be replicated in patterns such as the grid pattern repetition.

In block 206, the transformation is parsed into one or more operations. The operations include shearing, scaling, translating, reflecting, and rotating a base art. Transformations are associated with an operation or set of operations, as described in detail below with reference to FIGS. 2-7. A lookup table stores the set of associated operations for each transformation. Using the lookup table and the transformation to parse, the corresponding entry in the table is accessed and associated operation (or set of operations) is retrieved. Based on the entry from the lookup table, the transformation is parsed into the retrieved operation or set of operations. In some configurations, the desired operations may be determined by the user's selections for the transformation through a graphical user interface. For example, a user may select an option to perform a radial pattern repetition containing seven repetitions. In some configurations, the operations corresponding to a transformation may be embedded or hardcoded into the software executed to generate a repetition of the base art.

Operation configuration data for each operation is also determined. The different types of pattern repetitions require operation configuration data that is unique to the pattern described in detail below with reference to FIGS. 3-7. In some configurations, the user's dynamic interaction with the graphical user interface determines the types of operations and corresponding operation configuration data. For example, a user may select a radial pattern repetition with seven repetitions spanning 60 degrees around a center with coordinates (1, 6). Similarly, if a user selects the option to rotate the base art and positions the base art into the desired rotated position, the degree of rotation for the repetition is determined from the original position of the base art.

The values input by the user serve to determine the types of operations and operation configuration data that derive the coefficients that populate the affine transformation matrix. The coefficients for the affine transformation matrix are generated, as shown in block 208. The transformations and parsed operations can be distilled and expressed in the coefficients of the affine transformation matrix. For example, the coefficients of an affine transformation matrix with 6 coefficients "a," "b," "c," "d," "e," and "f" can be modified to determine the scaling, translation, reflection, and rotation to apply to the base art. Using the operation type and operation configuration data determined in block 206, the coefficient can be calculated accordingly. The operation type determines which coefficient is modified, while the operation configuration data determines the value of the coefficient. To provide uniformity, some operation configuration data may need to be converted into other forms, such as expressing the amount of rotation as degrees versus radians.

The type of operations determines which coefficient is modified. Operations involving scaling in the x- and y-directions affect the "a" and "d" coefficients, respectively. Likewise, operations for rotating the base art affect the "a," "b," "c," and "d" coefficients. Operations pertaining to translation in the x- and y-directions modify the "e" and "f" coefficients, respectively. The affine transformation matrix, using the following notation, shows the placement of each coefficient:

$$M = \begin{Bmatrix} a & b & e \\ c & d & f \\ 0 & 0 & 1 \end{Bmatrix}$$

However, it should be understood that the size and number of coefficients in the affine transformation can be modified based on the number of dimensions in the coordinate system of the base art.

The operation configuration data for each operation is then integrated into each coefficient based on the type of operation. The description of how operation configuration data is integrated into each coefficient for a variety of pattern repetitions is described in detail below with reference to FIGS. 3-7. In some configurations, the affine transformation matrix(ices) may be calculated by the CPU, shown as 1606 in FIG. 16, and stored within the CPU memory, shown as 1608 in FIG. 16.

The affine transformation matrix is then applied to the base art, as shown in block 210. This step involves determining the points of the base art and obtaining the coordinates for each point. Once retrieved, the coordinates are multiplied with the affine transformation matrix. In some configurations, the base art is stored as vector graphics and the points in the base art are the beginning and end of each vector. For raster images, the coordinates are the corners of the image. As described above, with respect to the application module 108 shown in FIG. 1, the application of the affine transformation matrix(ices) may involve having the GPU process the base art prior to multiplication. In some configurations, rows and columns are added to both the base art's coordinates and the affine transformation matrix(ices) to homogenize coordinate systems and facilitate multiplication.

If a particular transformation requires more than one affine transformation matrix to achieve the desired result, each set of coordinates may be multiplied by each of the affine transformation matrix. The order of multiplication of the matrices may also be dictated by the transformation. Likewise, multiple affine transformation matrices can be consolidated into one matrix, with the order of matrix multiplication reflecting that of the operations. For example, reflecting the base art across an axis and then rotating the base art may not produce the same transformation as rotating the base art and then reflecting it across the same axis. Likewise, in a repetition of prior repetitions, application of affine transformation matrices to earlier repetitions may be performed first in order to facilitate the creation of the follow-on repetitions.

Figure 16:
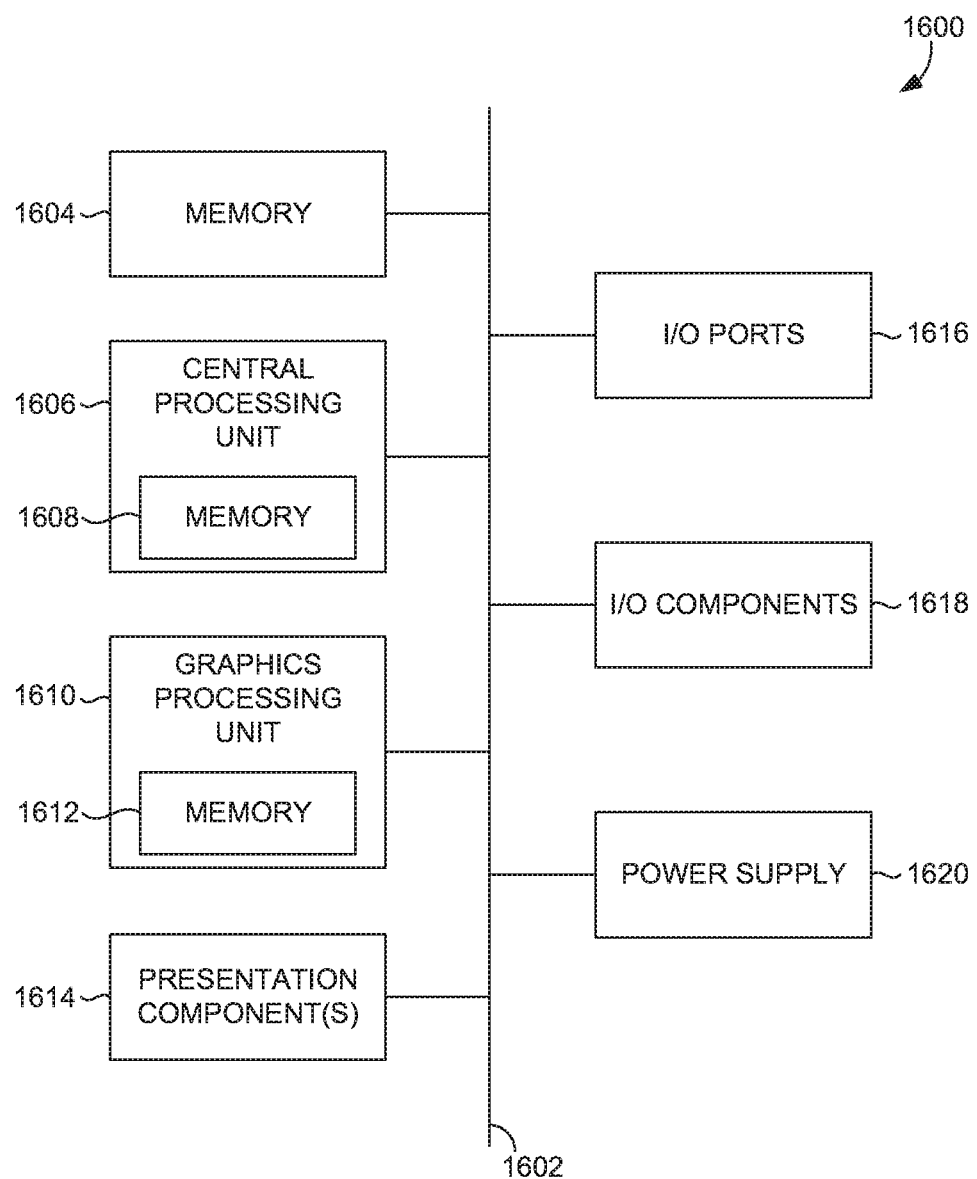
FIG. 16 is a block diagram of an exemplary computing environment suitable for use in implementations of the present disclosure.

In some configurations, the application of the affine transformation matrix, however, may take place within the GPU, shown as 1610 in FIG. 16, and the result stored in the GPU memory, shown as 1612 in FIG. 16. The affine transformation matrix(ices) are first uploaded from the CPU memory 1608 into the GPU memory 1612 and then the GPU 1610 draws the final graphic of repetitions, as described in detail with respect to the application module 108 in FIG. 1.

Building a Grid Pattern Repetition

Figure 3:
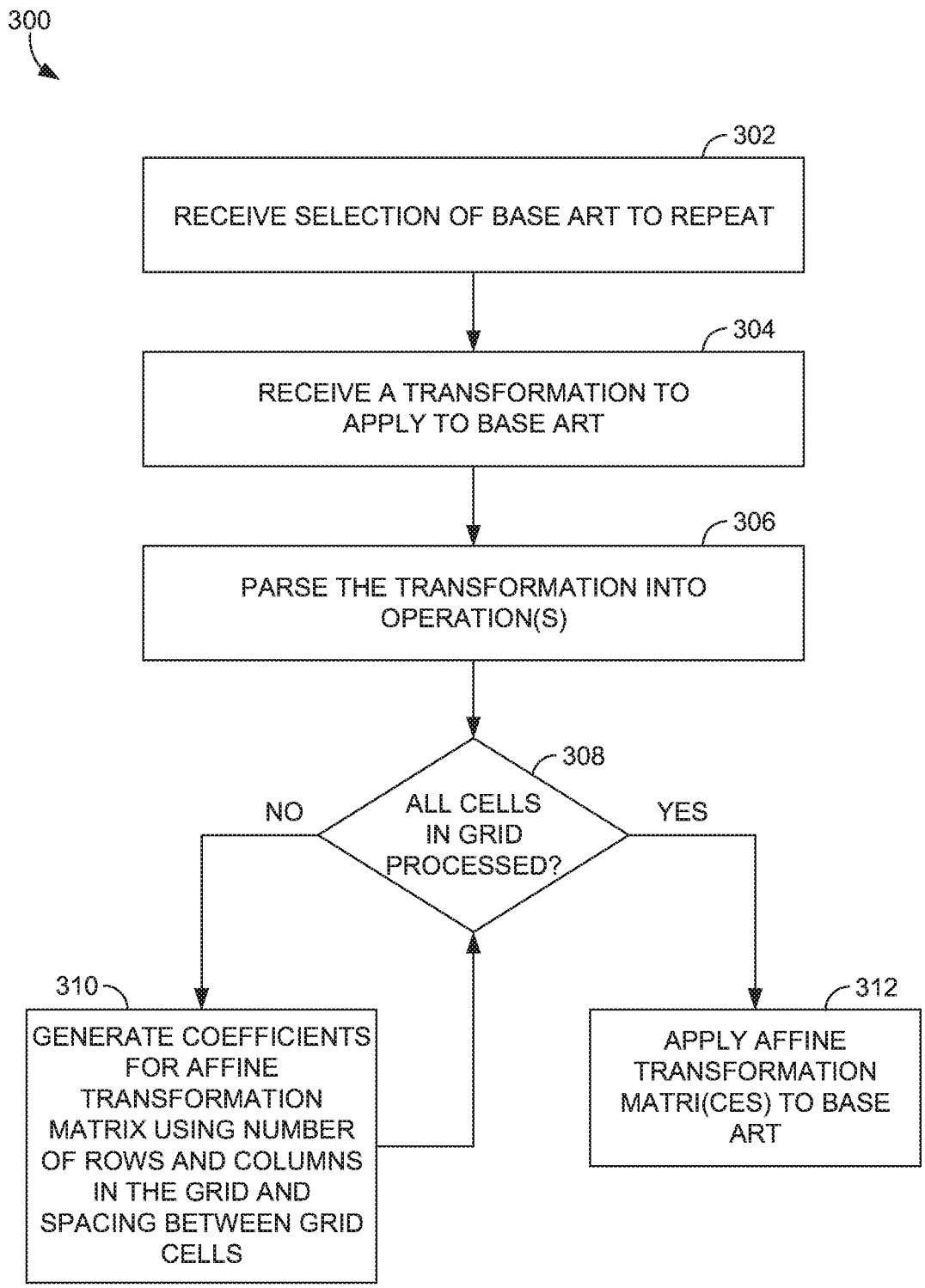
FIG. 3 is a flow diagram showing a method for generating a grid pattern repetition in accordance with some implementations of the present disclosure.

FIG. 3 is a flow diagram showing a method 300 for generating a grid pattern repetition. In some configurations, grid pattern repetition refers to a repetition of base art in every cell in a grid with a designated number of rows and columns. For instance, in a grid having 2 rows and 4 columns, the grid pattern repetition would require creating 8 repetitions to ensure there is a repetition in every cell of the grid.

As can be seen in FIG. 3, a base art selection is received in block 302. This step is similar to that of block 202 in FIG. 2. The transformation to apply to the base art is received, as shown in block 304. Similar to block 204, the user may select through a graphical user interface to create a grid pattern repetition. The user may also include operation configuration information regarding the number of rows and columns in the grid pattern repetition along with the spacing between grid cells.

The operation(s) is(are) then parsed from the transformation, as shown in block 306. As described in block 206 of FIG. 2, this process involves determining the type of operation and the operation configuration data. The operations performed for a grid pattern repetition are translating, and in some configurations, scaling, repetitions into a position in the grid with uniform grid spacing. Operation configuration data such as the spacing between cells, the number of rows and columns, and the number of cells in the grid are also parsed. As mentioned above in FIG. 2 with respect to 206, the operation configuration data may be input by the user through a user interface. For example, if the user selected the option to create a grid with 2 rows and 3 columns, the number of cells to create repetitions for would be 6. By multiplying the number of columns and rows in the grid pattern, the number of cells (and thus) repetitions to create is determined.

As shown in block 308, a decision point regarding whether all cells in the grid pattern have been processed is evaluated. If all of the cells in the grid pattern have not been processed, block 310 is performed next. If all of the cells have been processed, then block 312 is performed.

For a given cell, the coefficients for an affine transformation matrix are generated, as shown in block 310. The coefficients are determined based on the parsed operations and operation configuration data from block 306. A grid pattern repetition using a 3×3 affine transformation matrix will set the coefficients accordingly:

$a=d=1$ $b=c=0$ $e_{ij}=j*(S_{col}+B_{width})$ $f_{ij}=i*(S_{row}+B_{height})$

The subscripts i and j represent the $i^{th}$ row and the $j^{th}$ column in the grid pattern. For example, the affine transformation matrix created for the cell in the first row and second column would have the following values: i having a value of 1 and j having a value of 2. Additionally, $S_{row}$ and $S_{col}$ respectively represent the row and column spacing among grid cells received in block 302. Moreover, the value $B_{width}$ and $B_{height}$ represent the width and height of the base art.

The coefficient values are populated for each grid cell in the grid pattern using the operation configuration data. In some configurations, each time block 310 is performed, the values of i and j are incremented until all of the cells have been iterated through. In some configurations, each grid cell may have more than one affine transformation applied to create that repetition. It should be understood that any size of matrix and number of coefficients may be employed within the system 100 within the scope of the present invention. The process of generating coefficients for an affine transformation matrix(ices) for each cell in the grid pattern repetition is repeated until all of the grid cells have been processed.

Following from block 308, the affine transformation matrix(ices) is (are) applied to the base art, as shown in block 312. This step is similarly performed to block 210 in FIG. 2. If there is more than one affine transformation matrix, each matrix is applied one-by-one to the base art, following the order of operations in the transformation.

Figure 9:
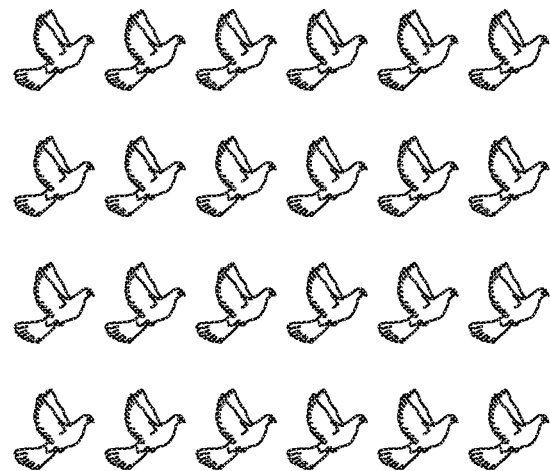
FIG. 9 is a computer graphic providing an example of a grid pattern repetition generated in FIG. 3.

FIG. 9 provides an example of a grid pattern repetition using the base art in FIG. 8. As can be seen in FIG. 9, the base art from FIG. 8 has been replicated into a grid pattern repetition with four rows and six columns. As also shown in FIG. 9, the spacing between the grid cells are uniform as are the sizes of each repetition.

Building a Radial Pattern Repetition

Figure 4:
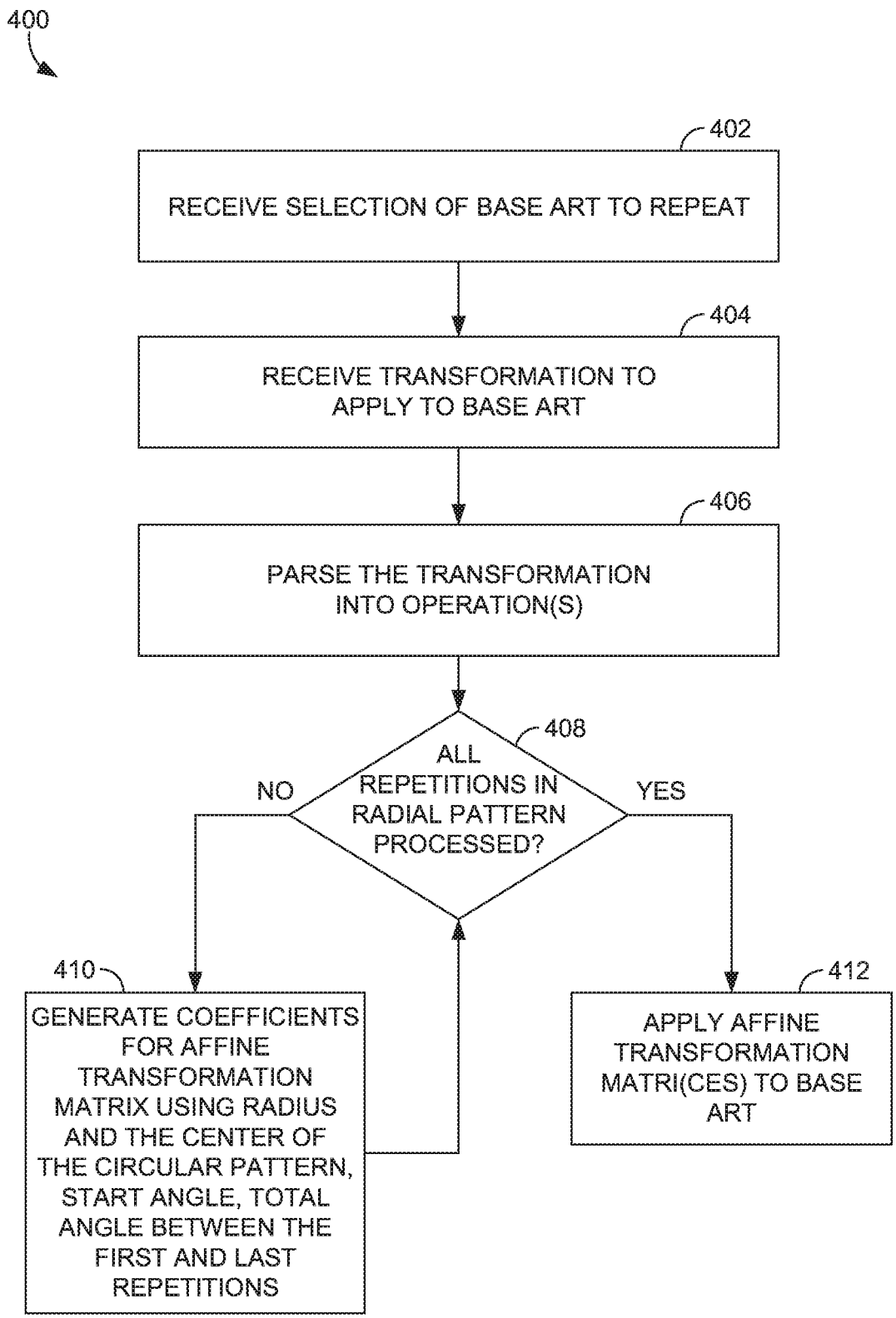
FIG. 4 is a flow diagram showing a method for generating a radial pattern repetition in accordance with some implementations of the present disclosure.

FIG. 4 is a flow diagram showing a method 400 for generating a radial pattern repetition. In some configurations, radial pattern repetition refers to repetitions of base art in a circular pattern around a designated center for a specified number of degrees. For instance, each repetition of the radial pattern repetition may be scaled or sized independent of the others. For example, one repetition may be scaled by 150% in the radial pattern repetition, while the second and third repetitions are scaled by 70% and 200%, respectively. In this example, despite the varying sizing and scaling, each repetition is rotated around a center for a designated number of degrees.

As can be seen in FIG. 4, A base art selection is received, as shown in block 402. This step is similar to that of block 202 in FIG. 2. The transformation to apply to the base art is received, as shown in block 404. Similar to block 204, the user may select through a graphical user interface to create a radial pattern repetition. The user may also include information regarding the radius, the center of the radial pattern repetition, and the center point of the base art. Likewise, the user may provide the start angle of repetitions around the center, the total angle between the first and last repetitions, and the total number of repetitions.

The operation(s) is(are) then parsed from the transformation, as shown in block 406. As described in block 206 of FIG. 2, this process involves determining the type of operation and the operation configuration data. For a radial pattern repetition, the operations involve rotating and translating each repetition. Operation configuration data includes information such as the radius, centers of the repetition and the base art along with the angle the repetition continues for and the total number repetitions. As mentioned above in FIG. 2 with respect to 206, the operation configuration data may be input by the user through a user interface.

For each repetition in the radial pattern, an affine transformation matrix is created. As shown in block 408, a decision point regarding whether all repetitions in the radial pattern have been processed is evaluated. If all of the repetitions in the radial pattern have not been processed, block 410 is performed. If all of the repetitions have been processed, then block 412 is performed.

For a given repetition in the pattern, the coefficients for an affine transformation matrix are generated, as shown in block 410. The coefficients are determined based on the parsed operations and the operation configuration from block 406. A radial pattern repetition using a 3×3 matrix will set the coefficients accordingly:

$$a_i = d_i = \sin \Phi_i$$

$$b_i = -\cos \Phi_i$$

$$c_i = \cos \Phi_i$$

$$e_i = -B_{c_x} * \sin \Phi_i + B_{c_y} * \cos \Phi_i + R_{c_x} + R_r * \cos \Phi_i$$

$$f_i = -B_{c_x} * \cos \Phi_i - B_{c_y} * \sin \Phi_i + R_{c_y} + R_r * \sin \Phi_i$$

$$\Phi_i = R_{\Phi_s} - \left(\frac{R_{\Phi_t}}{N}\right) * i$$

The subscript i represents the $i^{th}$ repetition in the radial pattern, with i having values between a range of 0 and N−1. For example, the affine transformation matrix created for the fourth repetition would have a value of i as 3. Additionally, $B_{c_x}$ and $B_{c_y}$ represent the coordinates for the center of the base art, while $R_{c_x}$ and $R_{c_y}$ represent the center of the radial pattern with a radius $R_r$, received in block 404. The value t represents the angle subtended by the given repetition about the x-axis and is calculated for each repetition as shown above. Moreover, the values $R_{\Phi_s}$ and $R_{\Phi_t}$ represent the starting angle that the first repetition is placed at and the total angle between the first and last repetitions, respectively. N represents the total number of repetitions.

The coefficient values are generated for each repetition in the radial pattern using the operation configuration data. Each time block 410 is performed, the value of i is incremented. In some configurations, each repetition in the radial pattern may have more than one affine transformation applied to create that repetition. It should be understood that any size of matrix and number of coefficients may be employed within the system 100 within the scope of the present invention. The process of creating an affine transformation matrix(ices) for each repetition in the radial pattern is repeated until all of the repetitions in the pattern have been processed.

Following from block 408, the affine transformation matrix(ices) is (are) applied to the base art, as shown in block 412. This step is similarly performed to block 210 in FIG. 2. If there is more than one affine transformation matrix, each matrix is applied one-by-one to the base art, following the order of operations in the transformation.

Figure 10:
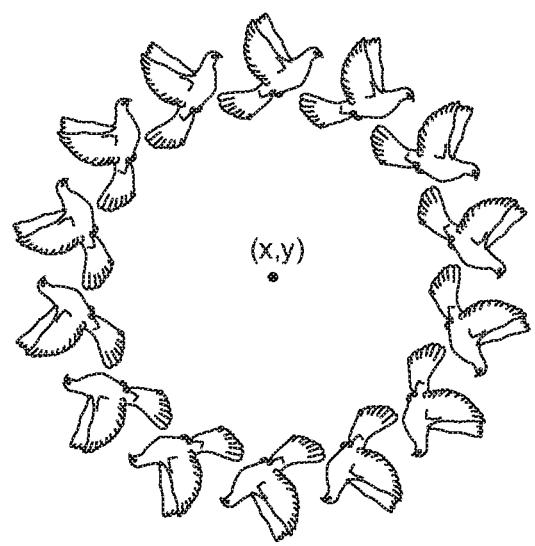
FIG. 10 is a computer graphic providing an example of a radial pattern repetition generated in FIG. 4.

FIG. 10 provides an example of a radial pattern repetition using the base art in FIG. 8. As can be seen in FIG. 10, the base art from FIG. 8 has been replicated into a radial pattern repetition with repetitions spanning the full 360 degrees. As also shown in FIG. 10, the repetitions are evenly spaced, of uniform size, and are rotated around a common epicenter with coordinates (x, y).

Building a Concentric Pattern Repetition

Figure 5:
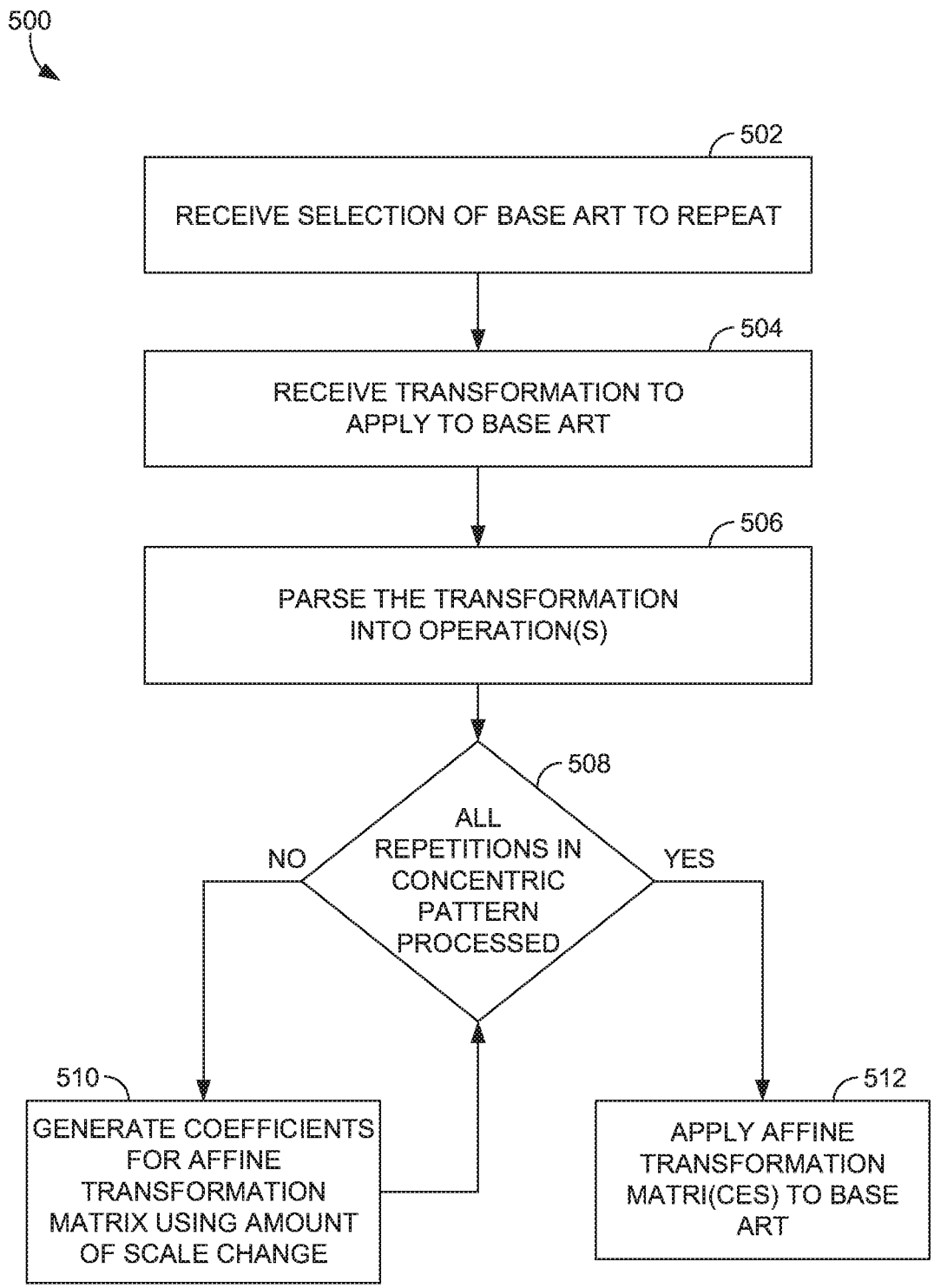
FIG. 5 is a flow diagram showing a method for generating a concentric pattern repetition in accordance with some implementations of the present disclosure.

FIG. 5 is a flow diagram showing a method 500 for generating a concentric pattern repetition. In some configurations, concentric pattern repetition refers to repetitions of base art scaled in size and layered on top of one another, where a successive repetition is increasingly scaled compared to the repetition preceding it. For example, in a concentric pattern repetition including three repetitions, the first repetition would appear as an instance of the base art scaled by 150%. In this example, the second concentric pattern repetition would appear as another instance of the base art 150% larger than the first repetition. Likewise, the third concentric pattern repetition would appear as an instance 150% larger than the second concentric pattern repetition. Given that each repetition is larger than the first, the smaller repetitions are placed on top of the larger repetitions. The same applies to successively smaller concentric pattern repetitions, with smaller repetitions placed on top of larger repetitions.

As can be seen in FIG. 5, A base art selection is received, as shown in block 502. This step is similar to that of block 202 in FIG. 2. The transformation to apply to the base art is received, as shown in block 504. Similar to block 204, the user may select through a graphical user interface to create a concentric pattern repetition. The user may also include information regarding the amount of scaling per repetition.

The operation(s) is(are) then parsed from the transformation, as shown in block 506. As described in block 206 of FIG. 2, this process involves determining the type of operation and the operation configuration data. For a concentric pattern, the operations involve scaling each repetition more than the preceding repetition. Operation configuration data such as the amount of scaling are also parsed. As mentioned above in FIG. 2 with respect to 206, the operation configuration data may be input by the user through a user interface. In some configurations, the scaling between successive repetitions are not uniform.

For each repetition in the concentric pattern repetition, an affine transformation matrix is created. As shown in block 508, a decision point regarding whether all repetitions in the concentric pattern repetition have been processed is evaluated. If all of the repetitions in the concentric pattern have not been processed, block 510 is performed. If all of the repetitions have been processed, then block 512 is performed.

For a given repetition, the coefficients for an affine transformation matrix are generated, as shown in block 510. The coefficients are determined based on the parsed operations from block 506. A concentric pattern repetition using a 3×3 matrix will set the coefficients accordingly:

$$a_i = d_i = 1 - i/N$$

$$b = c = 0$$

$$e = f = 0$$

The subscript i represents the $i^{th}$ repetition in the concentric pattern, with i having a range of values between 0 and N−1. For example, the affine transformation matrix created for the fourth repetition would have a value of i as 3.

The coefficient values are generated for each matrix for each repetition in the concentric pattern using the operation configuration data. In some configurations, each time block 510 is performed, the value of i is incremented until all of the repetitions have been iterated through. In some configurations, each repetition in the concentric pattern may have more than one affine transformation applied to create that repetition. It should be understood that any size of matrix and number of coefficients may be employed within the system 100 within the scope of the present invention. The process of creating an affine transformation matrix(ices) for each repetition in the concentric pattern repetition is repeated until all of the repetitions in the pattern have been processed.

Following from block 508, the affine transformation matrix(ices) is (are) applied to the base art, as shown in block 512. This step is similarly performed to block 210 in FIG. 2. The affine transformation matrix(ices) are also applied in order to reflect all repetitions. In some configurations, successively larger repetitions are placed behind the preceding repetition in order to show all repetitions. Similarly, successively smaller repetitions are placed on top of the preceding repetition in order to show all of the smaller repetitions created without having a larger repetition block the view of a smaller one. If there is more than one affine transformation matrix, each matrix is applied one-by-one to the base art, following the order of operations in the transformation.

Figure 11:
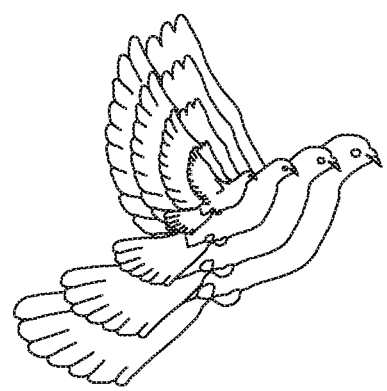
FIG. 11 is a computer graphic providing an example of a concentric pattern repetition generated in FIG. 5.

FIG. 11 provides an example of a concentric pattern repetition using the base art in FIG. 8. As can be seen in FIG. 11, the base art from FIG. 8 has been replicated into a concentric pattern repetition with 3 successively smaller repetitions. As also shown in FIG. 11, the scaling of the successive repetitions are uniform and they are all centered around the same epicenter, with smaller repetitions layered on top of larger repetitions.

Building a Symmetry Pattern Repetition

Figure 6:
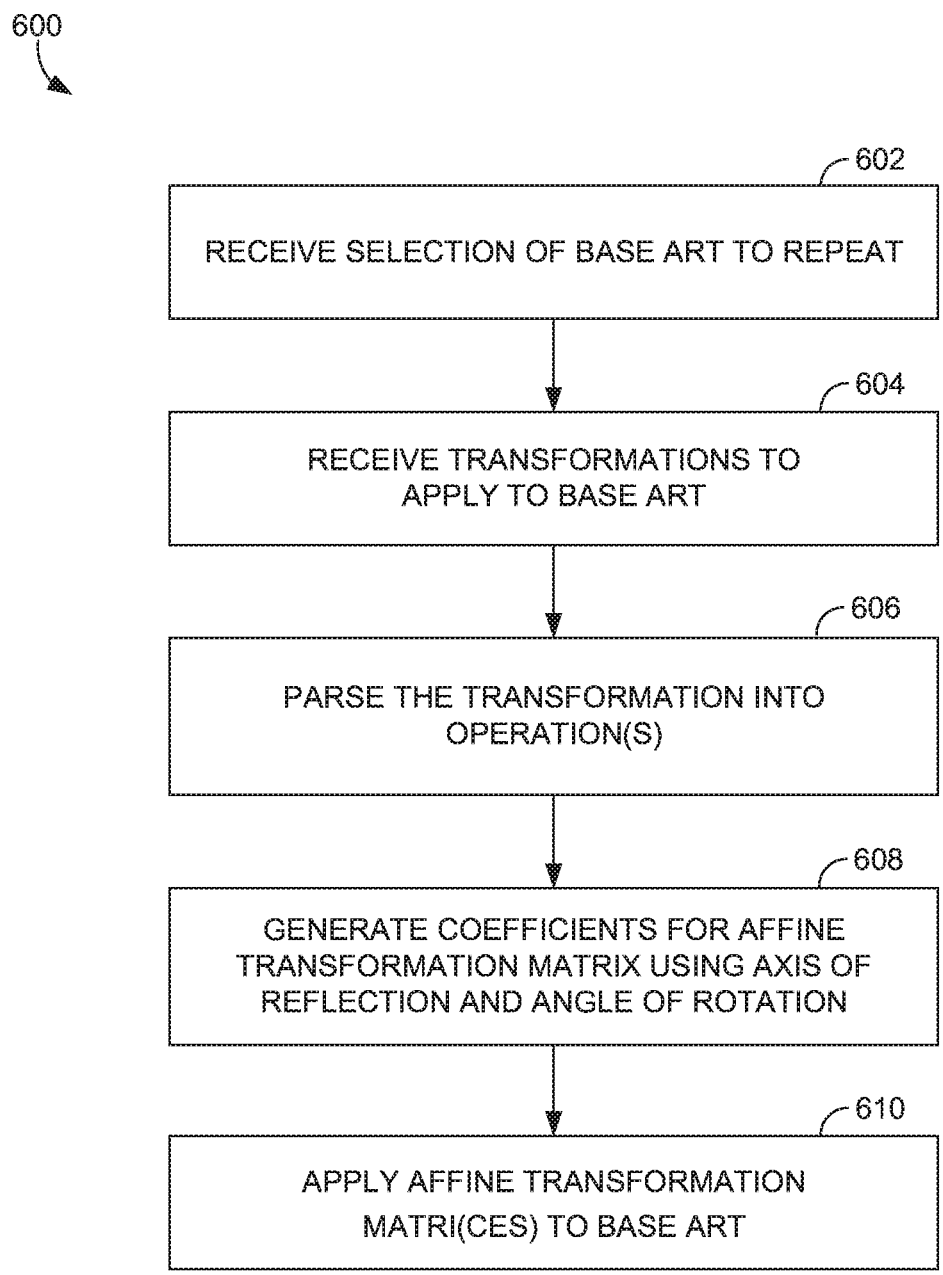
FIG. 6 is a flow diagram showing a method for generating a symmetry pattern repetition in accordance with some implementations of the present disclosure.

FIG. 6 is a flow diagram showing a method 600 for generating a symmetry pattern repetition. In some configurations, symmetry pattern repetition refers to repetitions of base art reflected across an axis and rotated to appear as a mirror image of the base art or a portion of the base art.

As can be seen in FIG. 6, a base art selection is received, as shown in block 602. This step is similar to that of block 202 in FIG. 2. The transformation to apply to the base art is received, as shown in block 604. Similar to block 204, the user may select through a graphical user interface to create a symmetry pattern repetition. The user may also include information regarding the axis that the symmetry takes place across along with the angle for rotation of the base art around the x-axis.

The operation(s) is(are) then parsed from the transformation, as shown in block 606. As described in block 206 of FIG. 2, this process involves determining the type of operation and the operation configuration data. For a symmetry pattern, there are always at least two repetitions. The first repetition creates the base art, while the second repetition creates the symmetric counterpart to the base art. The operations involve reflecting and rotating the base art to create the second repetition. Operation configuration data such as the angle of rotation, the coordinates of the axis to reflect the base art are also parsed, and a location of where the first repetition should be positioned. As mentioned above in FIG. 2 with respect to 206, the operation configuration data may be input by the user through a user interface. For each repetition in the symmetry pattern, an affine transformation matrix is created.

For each repetition, the coefficients for an affine transformation matrix are generated, as shown in block 608. The coefficients are determined based on the parsed operations from block 606. The first repetition involves creating a repetition of the base art aligned with the axis of reflection, which involves generating coefficients to translate the base art into the correct position. The second repetition involves reflecting the base art across an axis and rotating the base art around the x-axis. A symmetry pattern repetition using a 3×3 matrix will set the coefficients accordingly:

$a = \cos(2*\Phi)$ $b = c = \sin(2*\Phi)$ $d = -\cos(2*\Phi)$ $e = -S_x * \cos(2*\Phi) - S_y * \sin(2*\Phi) + S_x$ $f = -S_x * \sin(2*\Phi) + S_y * \cos(2*\Phi) + S_y$ $S_x$ and $S_y$ represent the coordinates about which the axis of reflection is centered, while $\Phi$ represents angle that the second repetition is rotated around the x-axis. In some configurations, each repetition in the symmetry pattern may have more than one affine transformation applied to create that repetition. It should be understood that any size of matrix and number of coefficients may be employed within the system 100 within the scope of the present invention.

The affine transformation matrix(ices) is (are) applied to the base art, as shown in block 610. This step is similarly performed to block 210 in FIG. 2. If there is more than one affine transformation matrix, each matrix is applied one-by-one to the base art, following the order of operations in the transformation.

Figure 12:
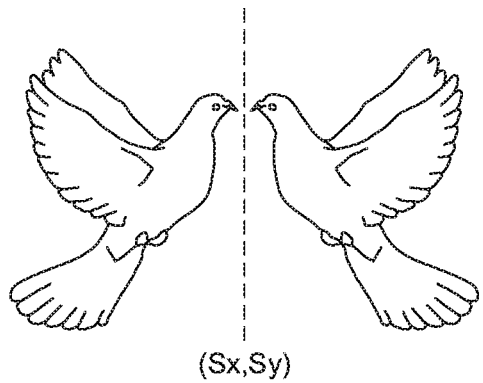
FIG. 12 is a computer graphic providing an example of a symmetry pattern repetition generated in FIG. 6.

FIG. 12 provides an example of a grid pattern repetition using the base art in FIG. 8. As can be seen in FIG. 12, the base art from FIG. 8 has been replicated into a symmetry pattern repetition with two repetitions: one of the base art to the left of the axis of symmetry and another of the base art reflected across an axis. As also shown in FIG. 12, the base art (or first repetition) has been reflected across an axis centered at ($S_x$, $S_y$) that is in between the two repetitions.

Building a Path Pattern Repetition

Figure 7:
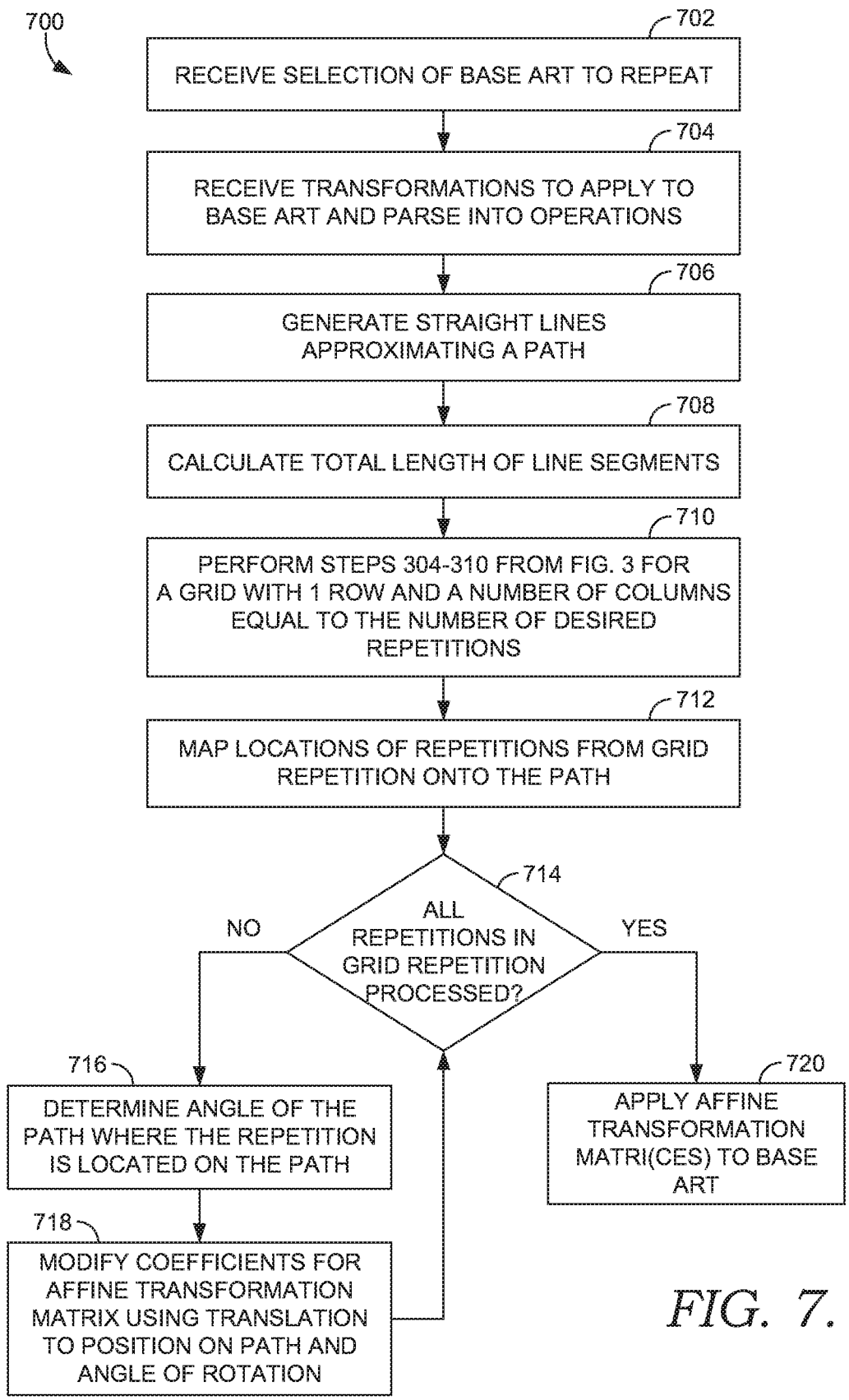
FIG. 7 is a flow diagram showing a method for generating a path pattern repetition in accordance with some implementations of the present disclosure.

FIG. 7 is a flow diagram showing a method 700 for generating a path pattern repetition. In some configurations, path pattern repetition refers to repetitions of base art along a path.

As can be seen in FIG. 7, a base art selection is received, as shown in block 702. This step is similar to that of block 202 in FIG. 2. The transformation to apply to the base art is received, as shown in block 704. Similar to block 204, the user may select through a graphical user interface to create a path pattern repetition. The user input may also include information regarding which path or curve the repetitions should align with and the number of desired repetitions. In some configurations, the path is an arbitrary path drawn by the user. This step includes parsing the operations from the transformation, as described in block 206 of FIG. 2. For a path pattern, the operations involve translating and rotating the repetitions into the correct position. Operation configuration data such as the number of repetitions and a path to align with the repetitions are also parsed. As mentioned above in FIG. 2 with respect to 206, the operation configuration data may be input by the user through a user interface. For each repetition in the path pattern repetition, an affine transformation matrix will be created as shown in the following blocks and discussed below.

Straight lines approximating the curve selected by the user are generated, as shown in block 706. The path created by the user is decomposed into a set of straight lines approximating the curve. The approximating straight lines are tangent to the curve and are used to express the curve as a series of short, straight line segments. In some configurations, prior to decomposing the path into a set of straight lines, the path drawn by the user is first deconstructed into a series of Bezier curves.

For the straight line approximations, the total length of the line segments is calculated, as shown in block 708. In some configurations, each straight line is the same length and the total length of the line segments is calculated by multiplying the number of line segments with the length of each line segment. In some configurations, each straight line is not uniform and the total is calculated by summing each individual line segment's length. Additionally, the straight line approximations may be calculated from the Bezier curves that model the path drawn by the user.

As shown in block 710, the blocks 302-310 from FIG. 3 are performed for a grid with 1 row and a number of columns equal to the number of desired repetitions. This step provides affine transformation matrix(ices) for a single row of repetitions that span the total length of the line segments. It should be understood that any method of creating repetitions to span the total length of the path may be employed within the system 100 within the scope of the present invention. These repetitions, however, are not yet in positions aligned with the path.

The repetitions are mapped to locations on the original path, as shown in block 712. The grid pattern repetition spanning the total line segment length with a row of repetitions is deconstructed into the line segments created in block 708 to determine which portion of the original path the repetition belongs to. These short line segments with a set of corresponding repetitions is then associated with a point on the original path. In some configurations, if a line segment contains one repetition, the coordinates of the point where the tangent line segment intersects with the original path are obtained. These coordinates are the location on the original path that the repetition will be placed in. If multiple repetitions are associated with a line segment, the repetitions are equally spaced on the line segment and the coordinates of the nearest points on the original path are calculated. It should be understood that any method of distributing repetitions on the line segments may be employed within the system 100 within the scope of the present invention.

As shown in block 714, a decision point regarding whether all repetitions in the path pattern have been processed is evaluated. If all of the repetitions in the path pattern have not been processed, block 716 is performed next. If all of the repetitions have been processed, then block 720 is performed.

For a given repetition, the angle of the path where the repetition is located on the path is determined, as shown in block 716. Using the mapped coordinates back to the original path, the angle of rotation of the repetition on the path can be determined. In some configurations, the corresponding line segment for that portion of the path is retrieved and the angle of rotation is determined by obtaining the slope of that tangent line segment. In some configurations, the angle of rotation is determined by taking a derivative of a Bezier curve at the point that the repetition is mapped back to on the path.

For a given repetition, the coefficients for affine transformation matrix(ices) is(are) modified, as shown in block 718. The coefficients in the affine transformation matrix(ices) derived in block 710 are then modified to reflect the operation configuration data determined in blocks 712 and 716. A path pattern repetition using a 3×3 matrix will modify the coefficients accordingly:

$$b_i = \sin \Phi_i$$

$$c_i = -\sin \Phi_i$$

$$e_i = -B_{c_x} * \cos \Phi_i - B_{c_y} * \sin \Phi_i + L_x$$

$$f_i = B_{c_x} * \sin \Phi_i - B_{c_y} * \cos \Phi_i + L_y$$

The subscript i represents the $i^{th}$ repetition in the path pattern. For example, the affine transformation matrix created for the fourth repetition would have a value of i as 4. The value $\Phi_i$ represents the angle of rotation for each repetition on the path based on the mapped location. Additionally, $B_{c_x}$ and $B_{c_y}$ represent the coordinates for the center of the base art, while $L_x$ and $L_y$ represent the translation of a repetition with respect to the base art to the mapped location on the path in the x- and y-directions, respectively.

These coefficient values are generated for each matrix for each repetition in the path pattern. Each time block 718 is performed, the value of i is incremented. In some configurations, each repetition in the path pattern may have more than one affine transformation applied to create that repetition. It should be understood that any size of matrix and number of coefficients may be employed within the system 100 within the scope of the present invention. The process of creating an affine transformation matrix(ices) for each repetition in the path pattern repetition is repeated until all of the repetitions in the pattern have been processed.

Following from block 714, the affine transformation matrix(ices) is (are) applied to the base art, as shown in block 720. This step is similarly performed to block 210 in FIG. 2. If there is more than one affine transformation matrix, each matrix is applied one-by-one to the base art, following the order of operations in the transformation.

Figure 13:
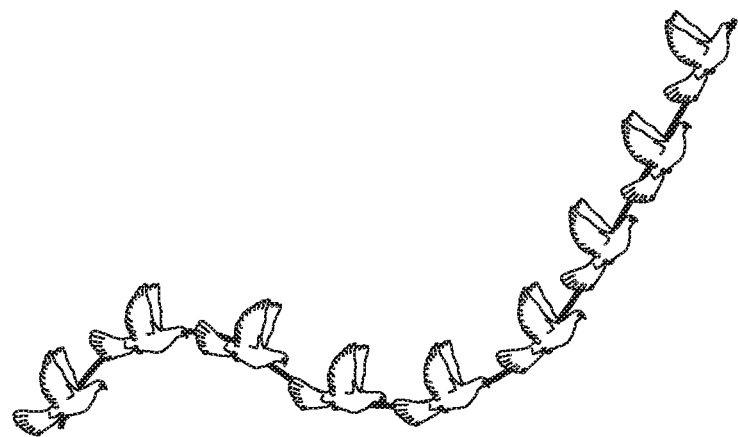
FIG. 13 is a computer graphic providing an example of a path pattern repetition generated in FIG. 7.

FIG. 13 provides an example of a path pattern repetition using the base art in FIG. 8. As can be seen in FIG. 13, the base art from FIG. 8 has been replicated into a path pattern repetition with nine repetitions spanning the length of the path. As also shown in FIG. 13, the spacing between the repetitions are uniform and each repetition has been rotated to match the angle of the line tangent to the point of intersection with the path.

Building a Nested Repetition

Figure 14:
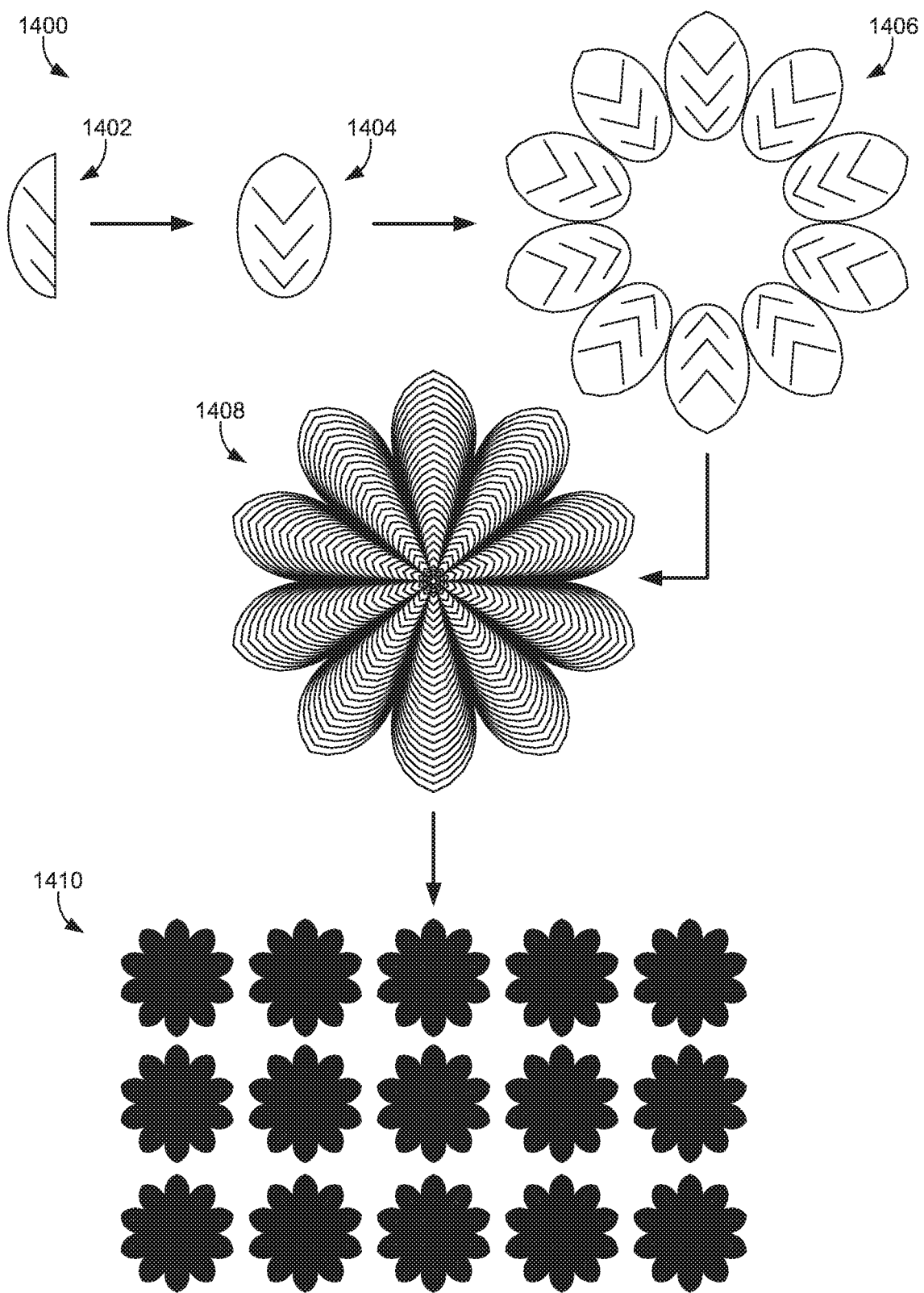
FIG. 14 is a computer graphic providing an example of nested repetitions showing four layers of nested repetitions.

Turning next to FIG. 14, an example of a nested repetition is provided that illustrates creating layers of nested repetitions. The example 1400 involves several levels of repetition, where each repetition is used to create another repetition. Base art 1402 is the computer graphic that is used to create the first repetition. In the first level of repetition, the base art 1402 is replicated to create repetition 1404. Using a symmetry pattern repetition, coefficients for affine transformation matrices are generated and applied to create the repetition 1404 of base art 1402. In some configurations, a repetition that is later used for base art is output as an off-screen texture that can then be used as an input for a second layer of repetition. For example, repetition 1404 would be stored as a raster image that could then be used as base art for another level of repetition. Repetition 1406 is a radial pattern repetition of repetition/base art 1404 that spans 360 degrees around an epicenter. Again, as before, the coefficients for affine transformation matrices are generated and stored. Repetition 1408 is yet another repetition of the repetition/base art 1406 with the concentric pattern repetition used, involving successively smaller repetitions of repetition/base art 1406. Likewise, repetition 1410 is a grid pattern repetition of repetition/base art 1408. This level of repetition similarly generates matrices and applies them to repetition/base art 1408. At each level, in some configurations, the earlier repetitions are not rendered for display until the final repetition is complete. For example, repetitions 1404, 1406, and 1408 may be stored as values in memory that are not yet displayable until the final repetition, 1410, is drawn for display.

As shown above, each repetition is stored as an affine transformation matrix applied to a previous repetition. This is particularly advantageous for base art stored as vector graphics, where rendering graphics based on nested copies of vector graphics can be cumbersome. Thus, instead of storing multiple copies of a base art, only the base art and a series of affine transformation matrices are stored and applied to create the nested repetitions of FIG. 14.

Figure 15:
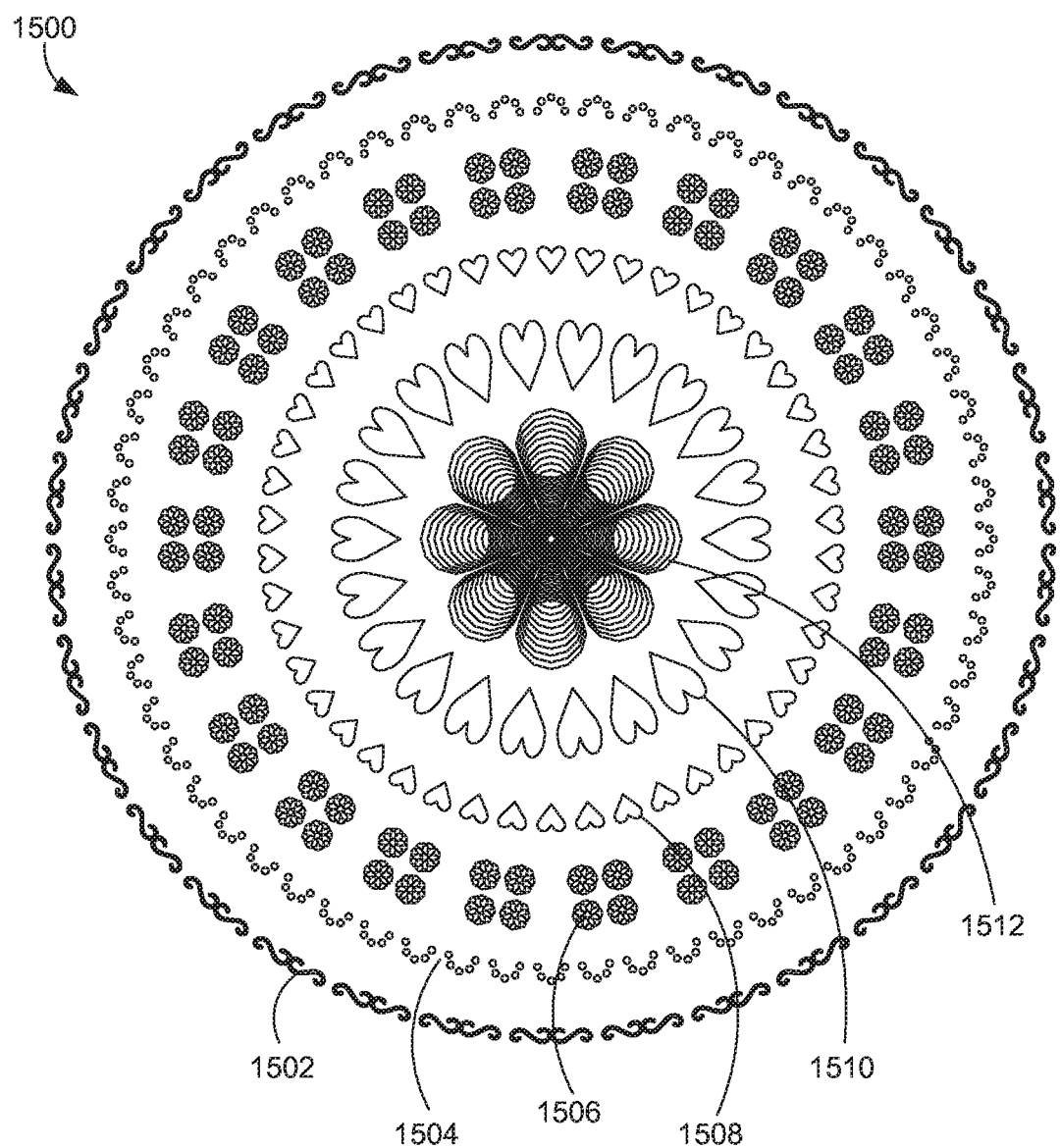
FIG. 15 is a computer graphic providing an example of nested repetitions showing six layers of repetitions.

FIG. 15 is another example of a nested repetition that illustrates several layers of nested repetitions. In repetition 1502, there is a symmetry pattern repetition applied to a symbol, that is then repeated using a radial pattern repetition. The second repetition, 1504, has two levels of radial pattern repetition: one to create the semi-circle shape of 5 tiny circles and the other to create the repetition of semi-circles. As seen in FIG. 15, the repetition 1504 has a radial pattern repetition with a shorter radius than that of 1502. The next repetition, 1506, involves first a grid pattern repetition and then a radial pattern repetition, again with a smaller radius than the preceding repetition. Repetition 1508 involves a radial pattern repetition of a heart symbol. The same heart is then scaled and distributed in a radial pattern repetition in repetition 1510. The final repetition, 1512, involves first a radial pattern repetition to create a ring of polygons that is then used to create a concentric pattern repetition of successively smaller repetitions.

In another implementation to create the computer graphic in FIG. 15, only the inner layer is a nested repetition, while the remaining layers of repetition are single level repetitions performed on the corresponding base art. The inner layer of repetition 1512 is a nested repetition with two layers of repetition: a repetition created by first generating a radial pattern repetition resulting in a ring of polygons, and a nested repetition that uses the radial pattern repetition as base art to then create a concentric pattern repetition of successively smaller repetitions. The remaining outer layers of repetition, 1502, 1504, 1506, 1508, and 1510 are radial pattern repetitions of a corresponding base art. Repetition 1502 is a radial pattern repetition of the curvy computer graphic. Likewise, repetition 1504 is a radial pattern repetition performed on the semi-circle of tiny circles computer graphic. Repetition 1506 is a radial pattern repetition of a computer graphic containing four flowers, while repetitions 1508 and 1510 are radial pattern repetitions of a heart symbol, each heart having a different size.

In either implementation creating the computer graphic in FIG. 15, each repetition is stored as a series of affine transformation matrices with one copy of the base art versus individual copies of each base art used for each repetition. Moreover, each repetition layer is created by applying matrices to a single copy of base art instead of applying transformations to each single copy of a base art. By just storing and applying multiple matrices, memory space and resource consumption are significantly cut down during processing.

Exemplary Operating Environment

Having described implementations of the present disclosure, an exemplary operating environment in which embodiments of the present invention may be implemented is described below in order to provide a general context for various aspects of the present disclosure. Referring initially to FIG. 16 in particular, an exemplary operating environment for implementing embodiments of the present invention is shown and designated generally as computing device 1600. Computing device 1600 is but one example of a suitable computing environment and is not intended to suggest any limitation as to the scope of use or functionality of the invention. Neither should the computing device 1600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 16, computing device 1600 includes bus 1602 that directly or indirectly couples the following devices: memory 1604, one or more central processing units (CPUs) 1606, one or more graphics processing units (GPUs) 1610, one or more presentation components 1614, input/output (I/O) ports 1616, input/output components 1618, and illustrative power supply 1620. Each CPU 1606 may comprise a general programmable electronic circuit that performs basic mathematical and logic operations. Each GPU 1608 may comprise a specialized programmable graphics electronic circuit designed to generate and render graphics and images for display. Bus 1602 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 16 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1600 typically includes a variety of computer-readable media. Computer-readable media can be any available media that can be accessed by computing device 1600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1604 includes computer storage media in the form of volatile and/or nonvolatile memory. The memory may be removable, non-removable, or a combination thereof. Exemplary hardware devices include solid-state memory, hard drives, optical-disc drives, etc. Computing device 1600 includes one or more processors (such as central processing unit 1606 and graphics processing unit 1610) that read data from various entities such as memory 1604 or I/O components 1618. These processors may have internal memory, such as the memory 1608 that is internal to the central processing unit or memory 1612 that is internal to the graphics processing unit. Presentation component(s) 1614 present data indications to a user or other device. Exemplary presentation components include a display device, speaker, printing component, vibrating component, etc.

I/O ports 1616 allow computing device 1600 to be logically coupled to other devices including I/O components 1618, some of which may be built in. Illustrative components include a microphone, joystick, game pad, satellite dish, scanner, printer, wireless device, etc. The I/O components 1618 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1600. The computing device 1600 may be equipped with depth cameras, such as, stereoscopic camera systems, infrared camera systems, RGB camera systems, and combinations of these for gesture detection and recognition. Additionally, the computing device 1600 may be equipped with accelerometers or gyroscopes that enable detection of motion.

As described above, implementations of the present disclosure relate to creating replications (and modifications of them) of an original computer graphic using matrices. The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   receiving, by the computing device, a selection of a base art to repeat as a plurality of repetitions of the base art;
   for each repetition of the base art:
      receiving a transformation to apply to the base art to produce the repetition of the base art; and
      generating, by the computing device, an affine transformation matrix in response to the received transformation; and
   generating an output, from a data structure comprising the affine transformation matrix for each repetition and the base art, the output comprising a graphic displaying the plurality of repetitions by applying the affine transformation matrix of each repetition to the base art.

2. The one or more computer storage media of claim 1, the operations further comprising:
   storing the data structure comprising the affine transformation matrix for each repetition and the base art.

3. The one or more computer storage media of claim 1, the operations further comprising generating a nested repetition by:
   generating a further affine transformation matrix; and
   applying the further affine transformation matrix to a first repetition to generate the nested repetition.

4. The one or more computer storage media of claim 1, wherein the affine transformation matrix for a first repetition from the plurality of repetitions is generated by determining an operation to perform on the base art to apply the transformation for the first repetition, the operation comprising rotation, translation, scale, shear, and/or reflection.

5. The one or more computer storage media of claim 4, wherein the affine transformation matrix for the first repetition is generated by generating a plurality of coefficients comprising values for rotating, translating, scaling, shearing, and/or reflecting the base art to produce the repetition.

6. The one or more computer storage media of claim 1, wherein the plurality of repetitions produce a pattern, the pattern comprising a grid pattern, a radial pattern, a concentric pattern, a symmetry pattern, or a path pattern.

7. The one or more computer storage media of claim 1, wherein the base art is stored as a vector graphic.

8. The one or more computer storage media of claim 1, wherein applying the affine transformation matrix for a first repetition to the base art to generate the first repetition comprises:
   storing the affine transformation matrix for the first repetition in central processing unit memory;
   uploading the affine transformation matrix for the first repetition to graphics processing unit memory; and
   applying, by a graphics processing unit, the affine transformation matrix for the first repetition to a plurality of coordinates of the base art.

9. The one or more computer storage media of claim 8, wherein applying the affine transformation matrix for the first repetition to the base art to generate the first repetition further comprises rendering a final graphic comprising the first repetition, by the graphics processing unit, based on application of the affine transformation matrix for the first repetition to the plurality of coordinates of the base art.

10. A computerized method comprising:
  receiving user input to generate a plurality of repetitions of a base art;
  for each repetition of the base art:
    determining an operation to perform on the base art to apply a transformation, the operation comprising scale, shear, rotation, translation, or reflection; and
    generating an affine transformation matrix comprising a value for each of a plurality of coefficients to implement the operation; and
  generating at a computing device an output for display, from a data structure comprising the affine transformation matrix and the base art, the output comprising a graphic comprising the plurality of repetitions by applying the plurality of coefficients from the affine transformation matrix for each repetition to a plurality of coordinates of the base art to generate a plurality of coordinates of each repetition.

11. The computerized method of claim 10, wherein determining the operation to perform on the base art to apply the transformation for each repetition comprises determining operation configuration data for each repetition, the operation configuration data for each repetition identifying a type of operation and at least one value to implement the operation.

12. The computerized method of claim 10, wherein generating the graphic comprises:
  storing the plurality of coordinates of the base art in central processing unit memory; and
  uploading the plurality of coordinates of the base art to graphics processing unit memory.

13. The computerized method of claim 10, wherein the user input to generate the plurality of repetitions provides a value to generate a concentric pattern repetition, the value comprising a value to scale the base art.

14. The computerized method of claim 10, wherein the user input to generate the plurality of repetitions provides a plurality of values to generate a radial pattern repetition, the plurality of values comprising a radius, a center of a pattern, a start angle of repetitions, or a total angle between repetitions in the plurality of repetitions.

15. The computerized method of claim 10, wherein the user input to generate the plurality of repetitions provides a plurality of values to generate a grid pattern repetition, the plurality of values comprising a row spacing, a column spacing, a number of rows, or a number of columns.

16. The computerized method of claim 10, wherein the user input to generate the plurality of repetitions provides a plurality of values to generate a symmetry pattern repetition, the plurality of values comprising an axis that the base art is reflected across or an angle or rotation.

17. The computerized method of claim 10, wherein the user input to generate the plurality of repetitions provides a plurality of values to generate a path pattern repetition, the plurality of values comprising a path, a plurality of straight line segments, or an angle of rotation.

18. The computerized method of claim 10, wherein a first repetition is stored as an off screen texture in order to generate a nested repetition.

19. A computerized method comprising:
  receiving user input to generate a plurality of repetitions of a base art;
  for each repetition of the base art:
    determining an operation to perform on the base art to apply a transformation, the operation comprising scale, shear, rotation, translation, or reflection; and
    generating a value for each of a plurality of coefficients to implement the operation;
  determining a plurality of coordinates of the base art; and
  generating, at a computing device, an output for display, the output comprising a graphic comprising the plurality of repetitions by applying an affine transformation matrix for each repetition to the plurality of coordinates of the base art to generate a plurality of coordinates of each repetition.

20. The computerized method of 19, further comprising generating a nested repetition by:
  generating a further affine transformation matrix; and
  applying the further affine transformation to a first repetition to generate a nested repetition, wherein the nested repetition is a repetition of the first repetition.

* * * * *

UNITED STATES PATENT AND TRADEMARK OFFICE
CERTIFICATE OF CORRECTION

PATENT NO. : 11,461,874 B2
APPLICATION NO. : 16/838864
DATED : October 4, 2022
INVENTOR(S) : Tarun Beri et al.

Page 1 of 1

It is certified that error appears in the above-identified patent and that said Letters Patent is hereby corrected as shown below:

In the Claims

Claim 20, Column 24, Line 35:
In the line reading "The computerized method of 19, further comprising" should read -- The computerized method of claim 19, further comprising --.

Signed and Sealed this
Twenty-fourth Day of January, 2023

Katherine Kelly Vidal
*Director of the United States Patent and Trademark Office*